(12) United States Patent
Sridharan et al.

(10) Patent No.: US 9,483,484 B1
(45) Date of Patent: Nov. 1, 2016

(54) TECHNIQUES FOR DEDUPLICATED DATA ACCESS STATISTICS MANAGEMENT

(75) Inventors: Srineet Sridharan, Aundh (IN); Anindya Banerjee, Wakad (IN); Atul Khandelwal, Pashan (IN)

(73) Assignee: Veritas Technologies LLC, Mountain View, CA (US)

( * ) Notice: Subject to any disclaimer, the term of this patent is extended or adjusted under 35 U.S.C. 154(b) by 53 days.

(21) Appl. No.: 13/101,668

(22) Filed: May 5, 2011

(51) Int. Cl.
G06F 17/30 (2006.01)

(52) U.S. Cl.
CPC ..... *G06F 17/3015* (2013.01); *G06F 17/30153* (2013.01)

(58) Field of Classification Search
CPC .......... G06F 17/3015; G06F 11/1453
See application file for complete search history.

(56) References Cited

U.S. PATENT DOCUMENTS

| | | | | |
|---|---|---|---|---|
| 5,815,418 A * | 9/1998 | Dolazza et al. | | 702/86 |
| 6,263,337 B1 * | 7/2001 | Fayyad | | G06F 17/30705 |
| 6,456,850 B1 * | 9/2002 | Kim et al. | | 455/453 |
| 6,542,886 B1 * | 4/2003 | Chaudhuri | | G06F 17/3061 |
| 7,222,127 B1 * | 5/2007 | Bem | | G06F 17/30687 |
| 7,950,004 B2 * | 5/2011 | Vieira et al. | | 717/125 |
| 8,112,505 B1 * | 2/2012 | Ben-Shaul et al. | | 709/219 |
| 8,364,858 B1 * | 1/2013 | Martin et al. | | 710/15 |
| 8,407,191 B1 * | 3/2013 | Nanda | | 707/692 |
| 8,412,727 B1 * | 4/2013 | Das | | G06F 17/30522 707/767 |
| 8,463,825 B1 * | 6/2013 | Harty et al. | | 707/813 |
| 2003/0018615 A1 * | 1/2003 | Chaudhuri | | G06F 17/30536 |
| 2003/0057613 A1 * | 3/2003 | Bansal et al. | | 264/555 |
| 2004/0139097 A1 * | 7/2004 | Farber et al. | | 707/100 |
| 2006/0120282 A1 * | 6/2006 | Carlson et al. | | 370/229 |
| 2006/0251311 A1 * | 11/2006 | Dioguardi et al. | | 382/131 |
| 2007/0011077 A1 * | 1/2007 | Smith et al. | | 705/37 |
| 2007/0266144 A1 * | 11/2007 | Bollen | | G06F 17/30722 709/224 |
| 2008/0189408 A1 * | 8/2008 | Cancel | | G06Q 30/02 709/224 |
| 2008/0281908 A1 * | 11/2008 | McCanne et al. | | 709/203 |
| 2009/0119172 A1 * | 5/2009 | Soloff | | G06Q 30/02 705/344 |
| 2009/0154821 A1 * | 6/2009 | Sorek et al. | | 382/250 |
| 2010/0070448 A1 * | 3/2010 | Omoigui | | H01L 27/1463 706/47 |
| 2010/0199042 A1 * | 8/2010 | Bates et al. | | 711/114 |
| 2010/0241807 A1 * | 9/2010 | Wu et al. | | 711/118 |
| 2010/0274772 A1 * | 10/2010 | Samuels | | 707/693 |
| 2010/0275128 A1 * | 10/2010 | Ward | | G06Q 10/06 715/744 |
| 2011/0010347 A1 * | 1/2011 | Cheriton et al. | | 707/692 |
| 2011/0022812 A1 * | 1/2011 | van der Linden et al. | | 711/163 |
| 2011/0072206 A1 * | 3/2011 | Ross et al. | | 711/108 |
| 2011/0087669 A1 * | 4/2011 | Ancin | | G06F 17/30628 707/740 |
| 2011/0161047 A1 * | 6/2011 | Sazuka | | 702/179 |
| 2011/0184778 A1 * | 7/2011 | Graepel et al. | | 705/7.31 |
| 2011/0196821 A1 * | 8/2011 | Hellerman et al. | | 707/600 |
| 2011/0276781 A1 * | 11/2011 | Sengupta et al. | | 711/216 |
| 2011/0307659 A1 * | 12/2011 | Hans et al. | | 711/114 |
| 2012/0023292 A1 * | 1/2012 | Saito et al. | | 711/114 |
| 2012/0027271 A1 * | 2/2012 | Zankowski | | 382/128 |

(Continued)

OTHER PUBLICATIONS

IBM Dictionary of Computing, McGraw-Hill, Inc, 1994, definition of Block, p. 67.*

*Primary Examiner* — Wilson Lee
(74) *Attorney, Agent, or Firm* — Wilmer Cutler Pickering Hale and Dorr LLP

(57) ABSTRACT

Techniques for data access statistics management are disclosed. In one particular embodiment, the techniques may be realized as a method for data access statistics management comprising determining that a portion of data has been deduplicated, and modifying access statistics of the portion of data for each reference to the portion of data.

17 Claims, 4 Drawing Sheets

(56) References Cited

U.S. PATENT DOCUMENTS

| | | | |
|---|---|---|---|
| 2012/0109907 A1* | 5/2012 | Mandagere et al. | 707/692 |
| 2012/0109908 A1* | 5/2012 | Barsness et al. | 707/693 |
| 2012/0131278 A1* | 5/2012 | Chang et al. | 711/118 |
| 2012/0173822 A1* | 7/2012 | Testardi et al. | 711/135 |
| 2012/0197911 A1* | 8/2012 | Banka | G06F 17/30864 707/752 |
| 2012/0221810 A1* | 8/2012 | Shah | G06F 13/16 711/158 |

* cited by examiner

TECHNIQUES FOR DEDUPLICATED DATA ACCESS STATISTICS MANAGEMENT

FIELD OF THE DISCLOSURE

The present disclosure relates generally to data access statistics and, more particularly, to techniques for deduplicated data access statistics management.

BACKGROUND OF THE DISCLOSURE

Optimization of data access may be performed using data access statistics. Data access statistics may include tracking writes and/or reads of a block, segment, or other portion of data. Data that is accessed more frequently may be considered as having a higher Input/Output (I/O) temperature. The data access statistics and/or I/O temperature of data may be used to make storage decisions about data (e.g., data with hotter I/O temperatures may be stored in storage with faster access times). However, data may be deduplicated, which may cause inaccurate data access statistics and/or loss of data access statistics. Specifically, duplicate segments or blocks of data may be eliminated and replaced with references to a single copy of the segments or blocks. Such deduplication may reduce storage needs, but eliminate and/or ignore data access statistics associated with the deleted duplicate segments or blocks. Such deduplication may result in incorrect data access statistics and/or I/O temperatures for a deduplicated block or segment.

In view of the foregoing, it may be understood that there may be significant problems and shortcomings associated with current data access statistics management technologies.

SUMMARY OF THE DISCLOSURE

Techniques for data access statistics management are disclosed. In one particular embodiment, the techniques may be realized as a method for data access statistics management comprising determining that a portion of data has been deduplicated, and modifying access statistics of the portion of data for each reference to the portion of data.

In accordance with other aspects of this particular embodiment, the techniques may further include receiving an indication that a plurality of portions of data are going to be deduplicated into a deduplicated portion of data, combining access statistics for the plurality of portions of data, and associating the combined access statistics with the deduplicated portion of data.

In accordance with further aspects of this particular embodiment, the access statistics may provide an indication of at least one of Input/Output (I/O) temperature and a access time.

In accordance with additional aspects of this particular embodiment, the Input/Output (I/O) temperature may be used to perform at least one of: determining which portions of data to pre-fetch into cache memory, and determining which portions of data to store in higher tier storage.

In accordance with additional aspects of this particular embodiment, higher tier storage may comprise at least one of: storage with faster access times, storage with faster seek times, and storage spread across multiple disks.

In accordance with additional aspects of this particular embodiment, the portion of data may comprise a block.

In accordance with additional aspects of this particular embodiment, the portion of data may comprise a segment.

In accordance with additional aspects of this particular embodiment, the techniques may further include detecting an additional reference being added to the deduplicated portion of data, and incrementing the access count of the deduplicated portion of data for the reference.

In accordance with additional aspects of this particular embodiment, the techniques may be realized as at least one non transitory processor readable non-transitory storage medium for storing a computer program of instructions configured to be readable by at least one processor for instructing the at least one processor to execute a computer process for performing the method.

In another particular embodiment, the techniques may be realized as an article of manufacture for data access statistics management, the article of manufacture comprising at least one non-transitory processor readable medium, and instructions stored on the at least one medium, wherein the instructions are configured to be readable from the at least one medium by at least one processor and thereby cause the at least one processor to operate so as to determine that a portion of data has been deduplicated, and modify access statistics of the portion of data for each reference to the portion of data.

In accordance with additional aspects of this particular embodiment, the instructions may be configured to further cause the processor to receive an indication that a plurality of portions of data are going to be deduplicated into a deduplicated portion of data, combine access statistics for the plurality of portions of data, and associate the combined access statistics with the deduplicated portion of data.

In accordance with additional aspects of this particular embodiment, the access statistics may provide an indication of at least one of Input/Output (I/O) temperature and an access time.

In accordance with additional aspects of this particular embodiment, the Input/Output (I/O) temperature may be used to perform at least one of: determining which portions of data to pre-fetch into cache memory, and determining which portions of data to store in higher tier storage.

In accordance with additional aspects of this particular embodiment, higher tier storage may comprise at least one of: storage with faster access times, storage with faster seek times; and storage spread across multiple disks.

In accordance with additional aspects of this particular embodiment, the portion of data may comprise a block. In accordance with additional aspects of this particular embodiment, the portion of data may comprise a segment.

In accordance with additional aspects of this particular embodiment, the instructions may be configured to further cause the processor to detect an additional reference being added to the deduplicated portion of data, and increment the access count of the deduplicated portion of data for the reference.

In yet another particular embodiment, the techniques may be realized as a system for data access statistics management comprising: one or more processors communicatively coupled to a network, wherein the one or more processors are configured to: determine that a portion of data has been deduplicated, and modify access statistics of the portion of data for each reference to the portion of data.

In accordance with additional aspects of this particular embodiment, the one or more processors may further be configured to: receive an indication that a plurality of portions of data are going to be deduplicated into a deduplicated portion of data, combine access statistics for the plurality of portions of data, and associate the combined access statistics with the deduplicated portion of data.

In accordance with additional aspects of this particular embodiment, the access statistics may provide an indication of at least one of Input/Output (I/O) temperature and an access time.

In accordance with additional aspects of this particular embodiment, the Input/Output (I/O) temperature may be used to perform at least one of: determining which portions of data to pre-fetch into cache memory, and determining which portions of data to store in higher tier storage.

The present disclosure will now be described in more detail with reference to particular embodiments thereof as shown in the accompanying drawings. While the present disclosure is described below with reference to embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
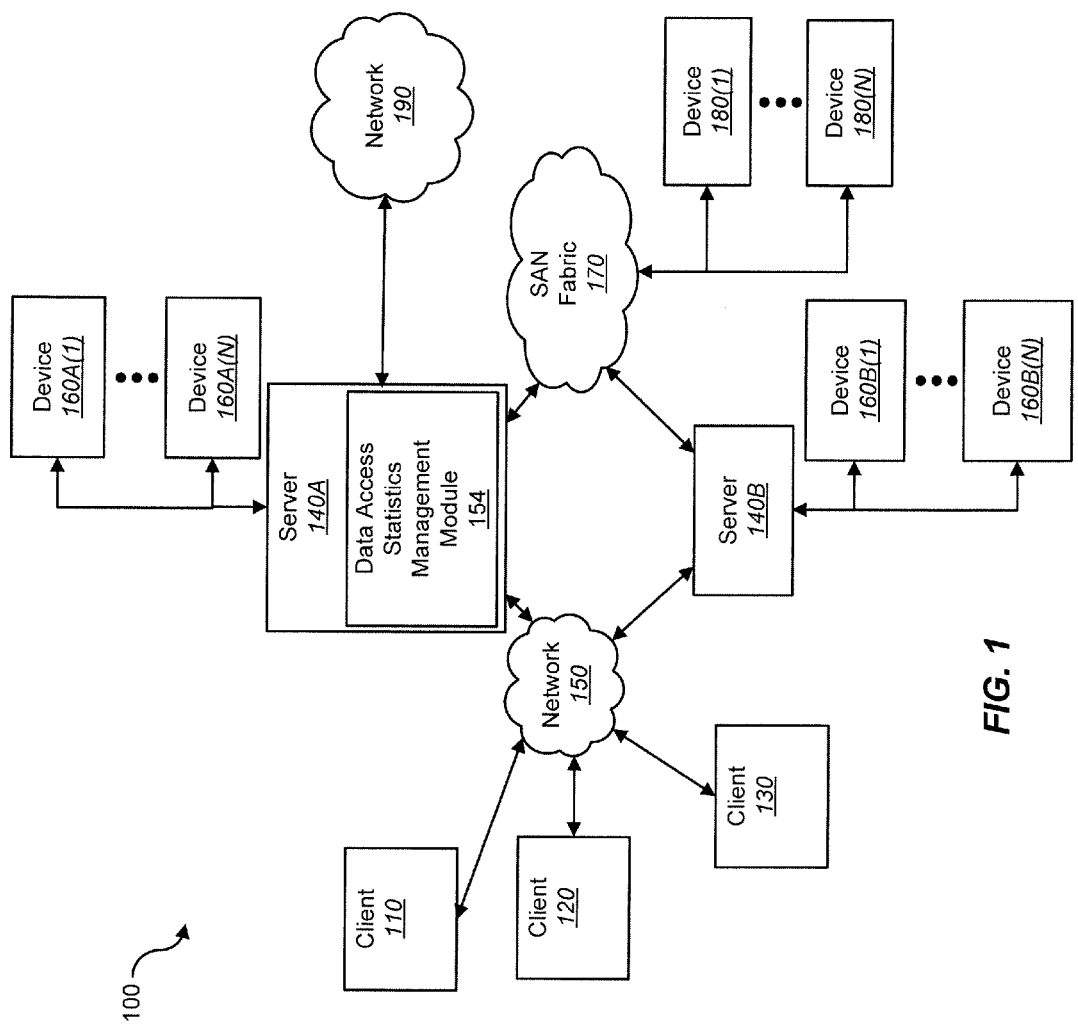
FIG. 1 shows a block diagram depicting a network architecture for data access statistics management in accordance with an embodiment of the present disclosure.

FIG. 1 shows a block diagram depicting a network architecture 100 for data access statistics management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., data access statistics management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190.

The description below describes network elements, computers, and/or components of a system and method for data access statistics management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are illustrative. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
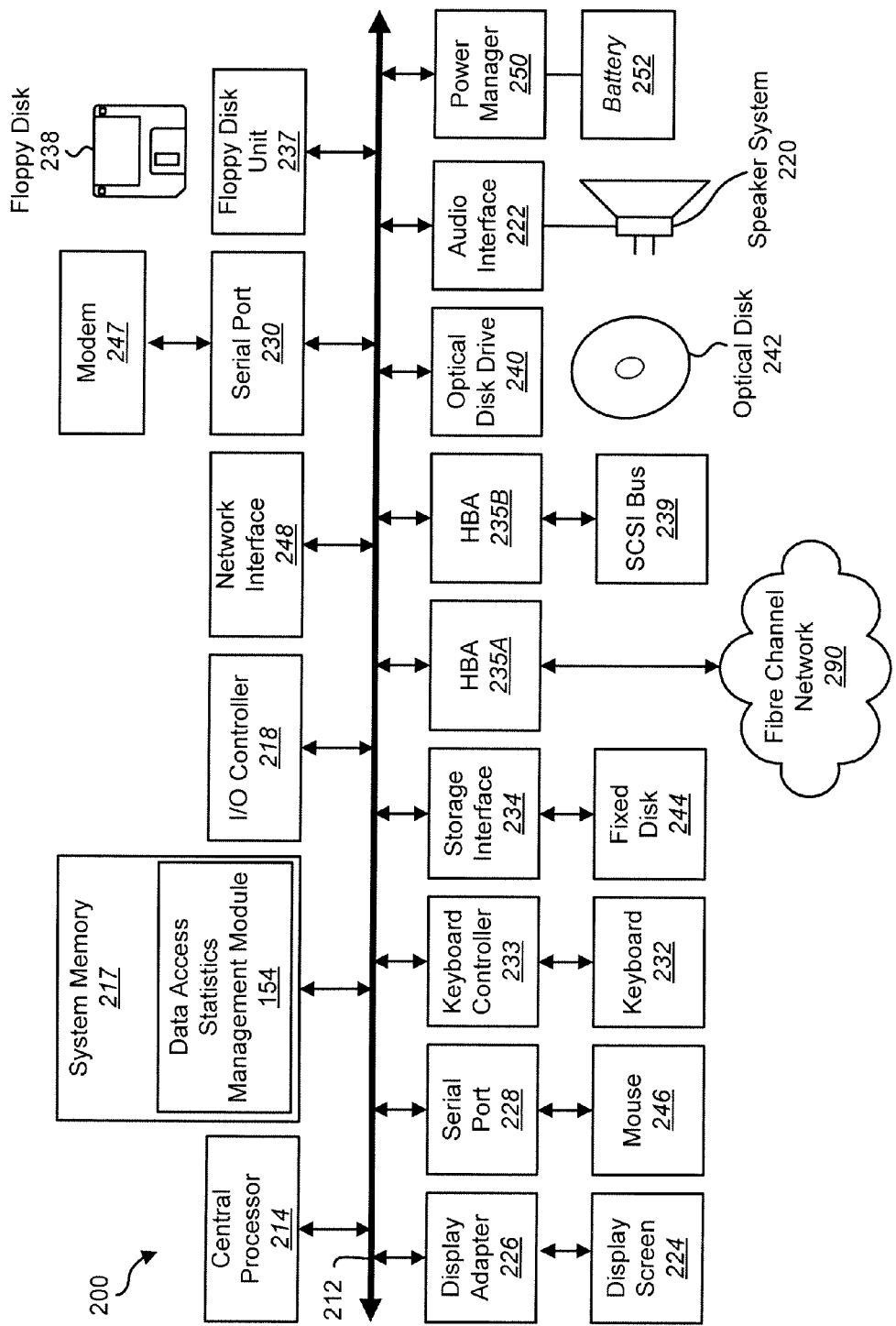
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the illustrative types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for deduplicating, backing up and/or archiving data. One or more portions of data may be deduplicated, backed up, and/or archived based on a backup policy and/or an archive applied, attributes associated with the data source, space available for backup, space available at the data source, or other factors.

According to some embodiments, clients 110, 120, and/or 130 may contain one or more portions of software for data access statistics management such as, for example, data access statistics management module 154. One or more portions of data access statistics management module 154 may reside at a network centric location. For example, server 140A may be a server, a firewall, a proxy server, a gateway, a search engine, or other network element that may perform one or more actions to provide data access statistics management. According to some embodiments, network 190 may be an external network (e.g., the Internet) and server 140A may be a gateway, a proxy server, a search engine, and/or a firewall between one or more internal components and clients and the external network.

According to some embodiments, data access statistics management module 154 may be implemented in several portions which may be co-located or located remote from one another. According to one or more embodiments, data access statistics management may be performed by a third party (e.g., a service provider).

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

According to some embodiments, Servers 140A and 140B may be servers deduplicating data. A system having deduplicated data may store files in the form of segments or blocks on storage (e.g., disk). Each of the segments is identified by fingerprints (e.g., MD5 checksums). Deduplication software may store data about files (metadata) as well as the data contained within the file (e.g., fingerprints for each of the respective segments). These segments or blocks may be copied from the storage to the memory (RAM) as and when required by the process. For example, deduplication software may determine whether requested segments are already in the cache, or not. Segment fingerprints may be checked in a local cache and storage index to determine uniqueness. If the fingerprint already exists, a reference may be added to the segment attributes in the database and the segment may not be uploaded to the storage. In such a scenario, access information or write I/O may not be updated since the segment is not actually flushed out or written to the storage. However when the segment is not present in cache, the segment may be read from the storage into cache. In such cases there may be a performance hit due to the read access time involved. Deduplicated segments may be spread across the disks (e.g., more fragmented), so at the time of read access there may be performance hit due to the disk seek times and rotational delays. According to some embodiments, data access statistics management module 154 may address this issue. For example, data access statistics management module 154 may track write I/O or write access information of deduplicated segments or blocks that are actually not written and/or flushed to backend storage in a deduplicated system. This may be helpful in optimizing identification of hot data by correctly calculating the write I/O temperature of deduplicated segments. For example, an additional attribute may be configured for deduplicated segments in storage that may keep the track of corresponding duplicate segments not written to storage. The additional attribute for write access information may be incremented by one for each segment not written to storage. Data access statistics management module 154 may ensure that deduplicated segments are counted at least once for each corresponding deduplicated block (e.g., access statistics may include a count, a weighted average, date stamps, etc.). For example, if six blocks contain duplicate data and only one is written to storage, data access statistics management module 154 may configure an attribute which may be incremented to six (reflecting the first write for the block written to storage as well as the five other blocks not written to storage that reference the deduplicated block.) According to some embodiments, data access statistics management module 154 may determine access statistics by counting references to a block and summing the reference count with the access statistics for the block in storage. According to other embodiments, access statistics may be modified in other ways to reflect the additional writes no reflected due to deduplication. For example, some access statistics may be date stamps or weighted averages.

Read requests, since they do not involve writing a data block, may always reach a block of data, whether inline or post-process (e.g., after backup) deduplication is occurring. Thus, a block of data may contain accurate read access statistics regardless of deduplication. Write access statistics however may traditionally be affected by deduplication.

According to some embodiments, data access statistics management module 154 may be invoked during deduplication and may be able to capture other access statistics that may have otherwise been lost during deduplication. For example, if three blocks contain duplicate data, data access statistics management module 154 may sum access statistics for each block and associate the summed statistics with the one deduplicated block written to storage (e.g., if a first block 31 has an access count of ten, a second block B2 has an access count of five, and a third block B3 has an access count of three, the deduplicated or merged block written to storage may have an access count of eighteen). Thus deduplicated blocks may have access counts which more accurately reflect the I/O temperature of the data.

According to some embodiments, data access statistics management module 154 may also track additional references added to a deduplicated block and may increment access statistics for the deduplicated block accordingly. For example, if a block is written to storage with an access count of five and deduplication software adds another reference to the block (indicating that a duplicate block was not written to storage), data access statistics management module 154 may increment the access count to six. According to some embodiments, data access statistics management module 154 may capture access statistics for the block not written to storage and may sum those access statistics with the deduplicated block in storage. Data access statistics management module 154 may, according to some embodiments, perform other modifications to reflect the access statistics (e.g., calculate a weighted average, add a date stamp, etc.).

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, data access statistics management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
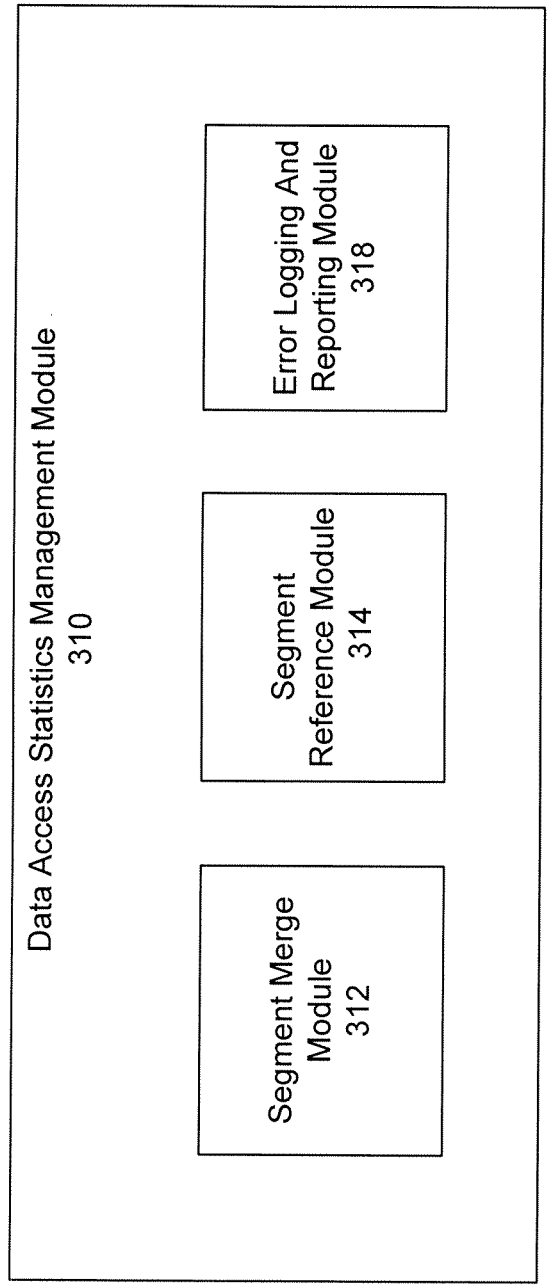
FIG. 3 shows a module for data access statistics management in accordance with an embodiment of the present disclosure.

Referring to FIG. 3, there is shown a data access statistics management module 310 in accordance with an embodiment of the present disclosure. As illustrated, the data access statistics management module 310 may contain one or more components including segment merge module 312, segment reference module 314, and error logging and reporting module 314.

Segment merge module 312 may capture access statistics of segments and/or blocks that are being merged or deduplicated. Segment merge module 312 may sum the statistics of the merged segments and/or blocks and associate them with the deduplicated segment and/or block written to storage. Segment merge module 312 may facilitate the capture of access statistics of segments and/or blocks merged as part of an inline deduplication process.

Segment reference module 314 may capture access statistics of blocks and/or segments deduplicated as part of an post storage deduplication process. According to some embodiments, segment merge module 312 may identify references to a deduplicated block and may sum a count of the identified references with current access statistics of the deduplicated block. According to some embodiments, other modifications to reflect the access statistics may be performed (e.g., calculation of a weighted average, adding a date stamp, etc.).

Error logging and reporting module 318 may produce logs, reports, or other information associated with data access statistics management.

Figure 4:
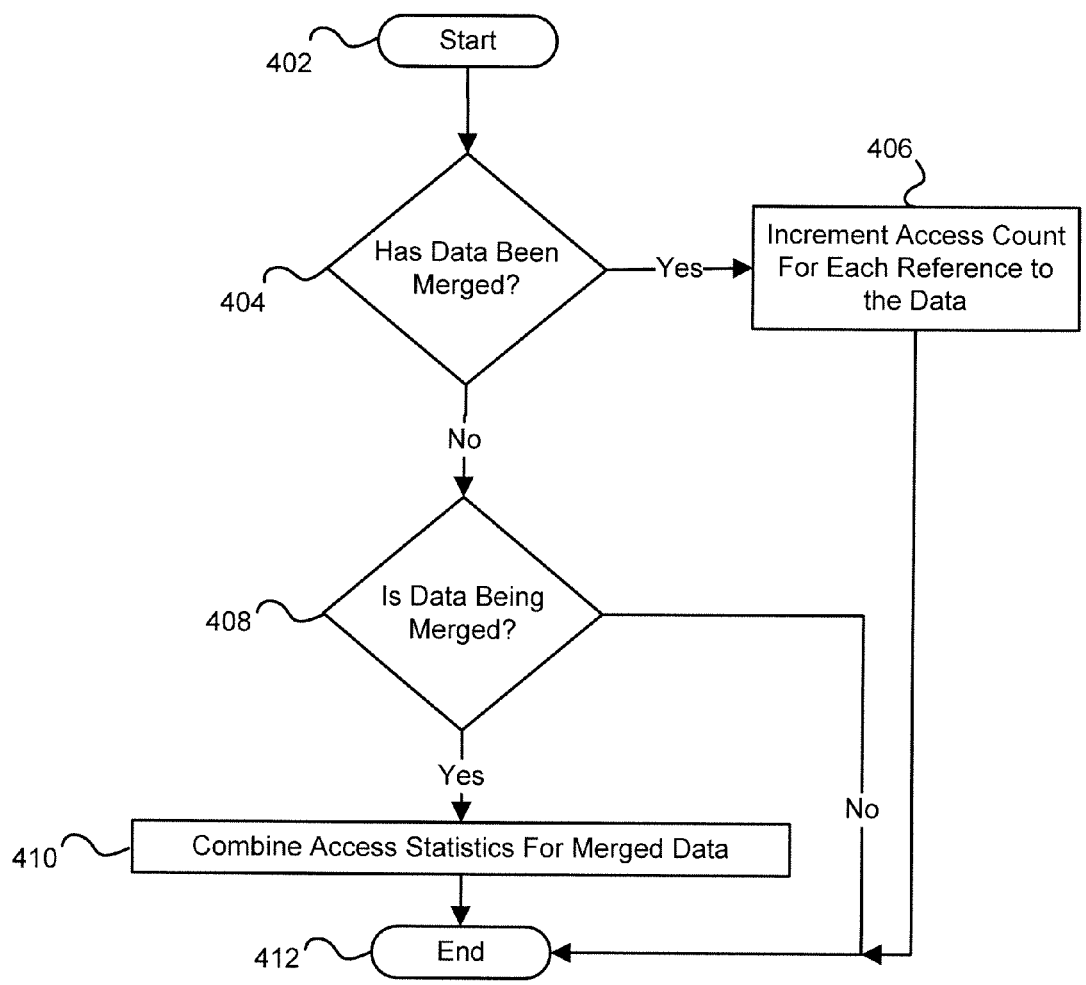
FIG. 4 depicts a method for data access statistics management in accordance with an embodiment of the present disclosure.

Referring to FIG. 4, there is depicted a method 400 for data access statistics management in accordance with an embodiment of the present disclosure. At block 402, the method 400 may begin.

At block 404, it may be determined whether a block has been merged (i.e., deduplicated). If a block has been merged the method may continue at block 406. If a block has not been merged the method may continue at block 408.

At block 406, an access count of the deduplicated or merged block may be incremented by one for each reference to the deduplicated block as part of a post-deduplication processing. According to some embodiments, other modifications to reflect the access statistics may be performed (e.g., calculation of a weighted average, adding a date stamp, etc.). A reference to a deduplicated block may indicate that another block would have been written if not for deduplication, therefore a reference may indicate an additional write that is not counted due to deduplication.

At block 408, it may be determined whether a block is being merged (e.g., inline deduplication is occurring for that block). If a block is being merged, the method may continue at block 410. If a block is not being merged, the method may end at block 412.

At block 410, access statistics for blocks to be merged (i.e., deduplicated blocks) may be combined. Access statistics may be captured for each of the duplicate blocks prior to merging and may be summed or otherwise modified to reflect the additional access statistics (e.g., access statistics may include a count, a weighted average, date stamps, etc.). The summed access statistics may be associated with the merged block (e.g., an attribute associated with a merged/deduplicated block may serve as a counter).

At block 412, the method may end.

At this point it should be noted that data access statistics management in accordance with the present disclosure as described above typically involves the processing of input data and the generation of output data to some extent. This input data processing and output data generation may be implemented in hardware or software. For example, specific electronic components may be employed in a data access statistics management module or similar or related circuitry for implementing the functions associated with data access statistics management in accordance with the present disclosure as described above. Alternatively, one or more processors operating in accordance with instructions may implement the functions associated with data access statistics management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for data access statistics management comprising:
    determining, using at least one computer processor, that a portion of data of a plurality of portions of data has been deduplicated by receiving an indication that the plurality of portions of data are going to be deduplicated into a deduplicated portion of data;
    combining access statistics for the plurality of portions of data by incrementing access statistics associated with the deduplicated portion of data to indicate an additional write request for each additional reference to the portion of data contained in an access statistic associated with a deduplicated instance of the deduplicated portion of data, wherein the access statistics comprise a weighted average, and wherein each additional reference indicates that a duplicate block was not written to storage; and
    associating the combined access statistics with the deduplicated portion of data.

2. The method of claim 1, wherein the access statistics provide an indication of at least one of Input/Output (I/O) temperature and a access time.

3. The method of claim 1, wherein the access statistics provide an indication of Input/Output (I/O) temperature, and wherein the Input/Output (I/O) temperature is used to perform at least one of:
    determining which portions of data to pre-fetch into cache memory; and
    determining which portions of data to store in higher performance storage.

4. The method of claim 3, wherein higher performance storage comprises at least one of:
    storage with faster access times; storage with faster seek times; and
    storage spread across multiple disks.

5. The method of claim 1, wherein the portion of data comprises a block.

6. The method of claim 1, wherein the portion of data comprises a segment.

7. The method of claim 1, further comprising:
    detecting a reference being added to the deduplicated portion of data; and
    incrementing the access count of the deduplicated portion of data for the reference.

8. At least one non-transitory processor readable non-transitory storage medium for storing a computer program of instructions configured to be readable by at least one processor for instructing the at least one processor to execute a computer process for performing the method as recited in claim 1.

9. An article of manufacture for data access statistics management, the article of manufacture comprising:
    at least one non-transitory processor readable medium; and
    instructions stored on the at least one medium;
    wherein the instructions are configured to be readable from the at least one medium by at least one processor and thereby cause the at least one processor to operate so as to:
    determine that a portion of data of a plurality of portions of data has been deduplicated by receiving an indication that a plurality of portions of data are going to be deduplicated into a deduplicated portion of data;
    combine access statistics for the plurality of portions of data by incrementing access statistics associated with the deduplicated portion of data to indicate an additional write request for each additional reference to the portion of data contained in an access statistic associated with a deduplicated instance of the deduplicated portion of data, wherein the access statistics comprise a weighted average, and wherein each additional reference indicates that a duplicate block was not written to storage; and
    associate the combined access statistics with the deduplicated portion of data.

10. The article of manufacture of claim 9, wherein the access statistics are to perform at least one of:
    determining which portions of data to pre-fetch into cache memory; and
    determining which portions of data to store in higher performance storage.

11. The article of manufacture of claim 9, wherein the access statistics are used to determine which portions of data to store in higher performance storage, and wherein higher performance storage comprises at least one of:
    storage with faster access times; storage with faster seek times; and
    storage spread across multiple disks.

12. The article of manufacture of claim 9, wherein the portion of data comprises a block.

13. The article of manufacture of claim 9, wherein the portion of data comprises a segment.

14. The article of manufacture of claim 9, wherein the instructions are configured to further cause the processor to:
   detect a reference being added to the deduplicated portion of data; and
   increment the access count of the deduplicated portion of data for the reference.

15. A system for data access statistics management comprising:
   one or more processors communicatively coupled to a network; wherein the one or more processors are configured to:
   determine that a portion of data of a plurality of portions of data has been deduplicated by receiving an indication that a plurality of portions of data are going to be deduplicated into a deduplicated portion of data;
   combine access statistics for the plurality of portions of data by incrementing access statistics associated with the deduplicated portion of data to indicate an additional write request for each additional reference to the portion of data contained in an access statistic associated with a deduplicated instance of the deduplicated portion of data, wherein the access statistics comprise a weighted average, and wherein each additional reference indicates that a duplicate block was not written to storage; and
   associate the combined access statistics with the deduplicated portion of data.

16. The system of claim 15, wherein the access statistics provide an indication of at least one of Input/Output (I/O) temperature and an access time.

17. The system of claim 15, wherein the access statistics provide an indication of Input/Output (I/O) temperature, and wherein the Input/Output (I/O) temperature is used to perform at least one of:
   determining which portions of data to pre-fetch into cache memory; and
   determining which portions of data to store in higher performance storage.

* * * * *